United States Patent [19]

Grove et al.

[11] 4,140,048
[45] Feb. 20, 1979

[54] TOAST LOAD SELECTOR MECHANISM

[75] Inventors: Lawrence L. Grove, Center Valley; Paul V. Snyder, Whitehall, both of Pa.

[73] Assignee: General Electric Company, Bridgeport, Conn.

[21] Appl. No.: 869,662

[22] Filed: Jan. 16, 1978

[51] Int. Cl.$^2$ .............................................. A47J 27/62
[52] U.S. Cl. .................... 99/332; 219/489; 337/361
[58] Field of Search ................................ 99/332–336, 99/327, 328; 337/360, 361; 219/489, 486, 492, 413

[56] References Cited

U.S. PATENT DOCUMENTS

| | | | |
|---|---|---|---|
| 2,034,865 | 3/1936 | Hart | 337/360 |
| 2,402,354 | 6/1946 | Waddell | 219/486 |
| 2,441,192 | 5/1948 | Graves | 219/489 |
| 2,769,061 | 10/1956 | White et al. | 337/361 |
| 3,202,798 | 8/1965 | Schauer | 219/413 |
| 3,684,860 | 8/1972 | Snyder | 219/413 |
| 4,065,658 | 12/1977 | Keim | 99/329 X |

FOREIGN PATENT DOCUMENTS 814553  6/1959  United Kingdom ..................... 99/329

*Primary Examiner*—Leonard D. Christian
*Attorney, Agent, or Firm*—George R. Powers; Leonard J. Platt; John F. Cullen

[57] ABSTRACT

A toast load selector mechanism for use with toasters accommodating varying toast loads of from one to a plurality of bread slices or other food items for toasting and having a toasting time interval timer including a manually operable brownness control knob for adjusting the toasting time interval, the brownness control movable through an adjustment range between a first position setting a minimum time interval for toasting a minimum toast load to the lightest brown condition and a second position setting a maximum time interval for toasting the maximum toast load to the darkest brown condition. The toast load selector mechanism comprises a toast load selector member which is mounted concentrically with the brownness control knob, the toast load selector member defining first and second stops limiting the adjustment range of the brownness control to a subrange applicable to a given toast load selected by the toast load selector member. The toast load selector member is preferably held in yielding detent engagement in each of the toast load positions and indicia are provided for indicating the selected toast load position. Indicia indicating light or dark settings of the brownness control knob preferably applied to the toast load selector member adjacent the first and second stops.

14 Claims, 10 Drawing Figures

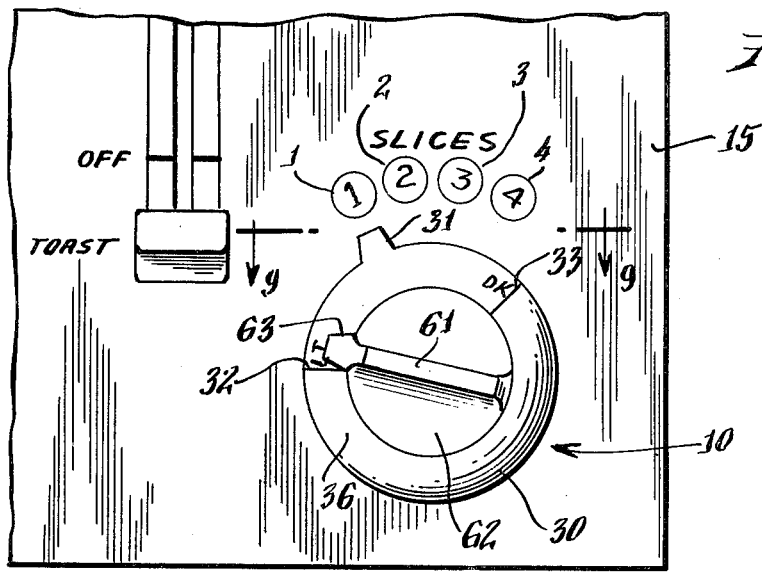
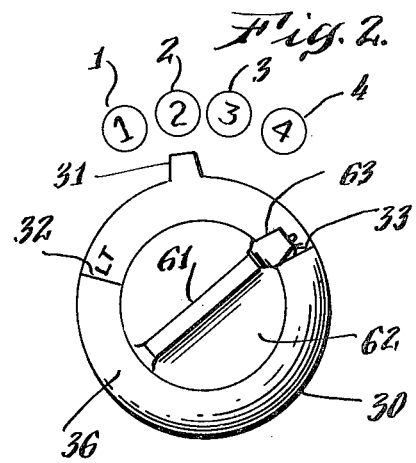
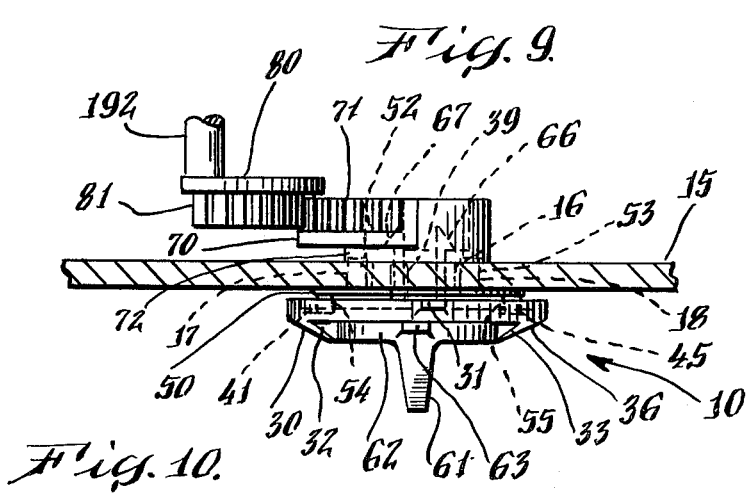
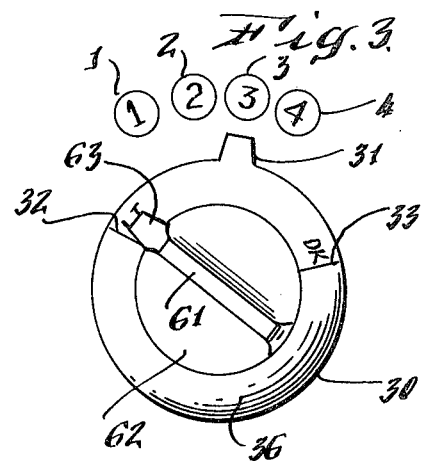
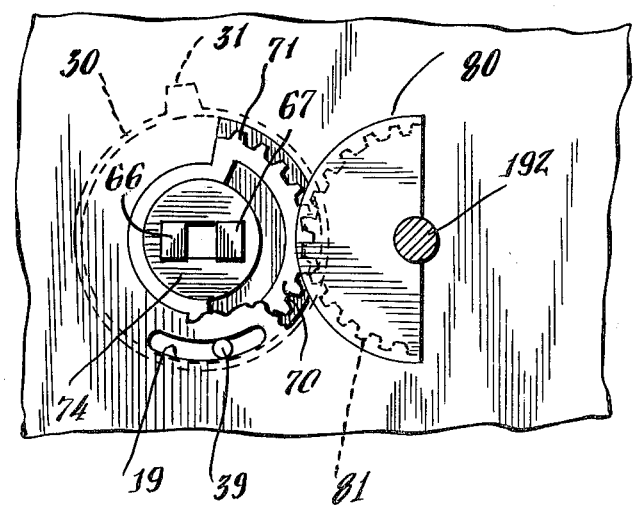
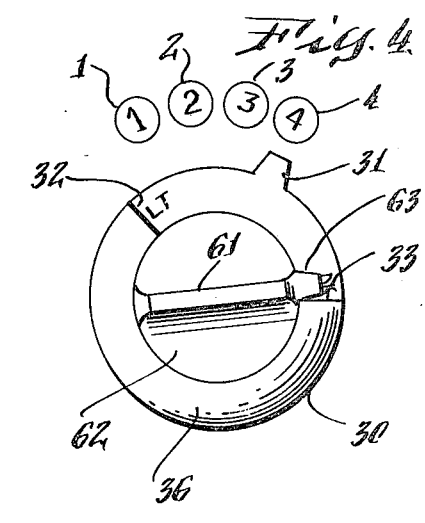

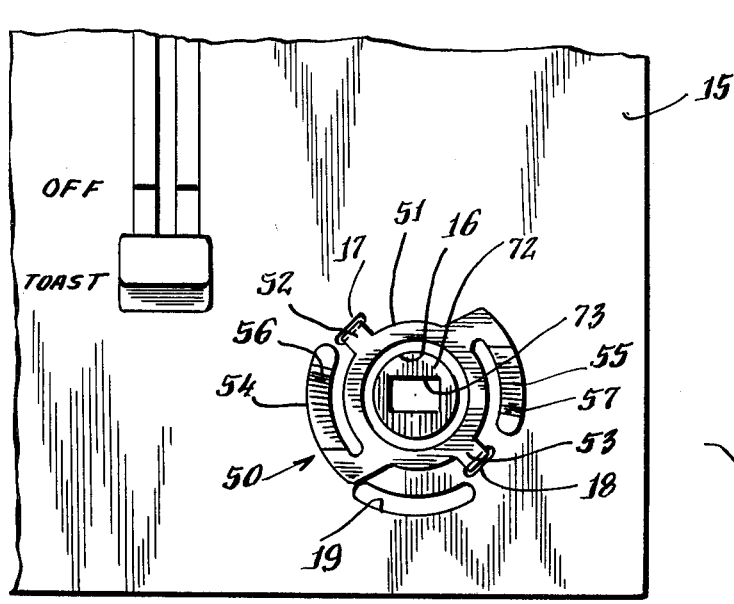
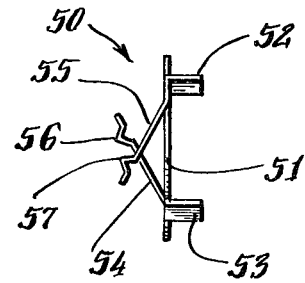
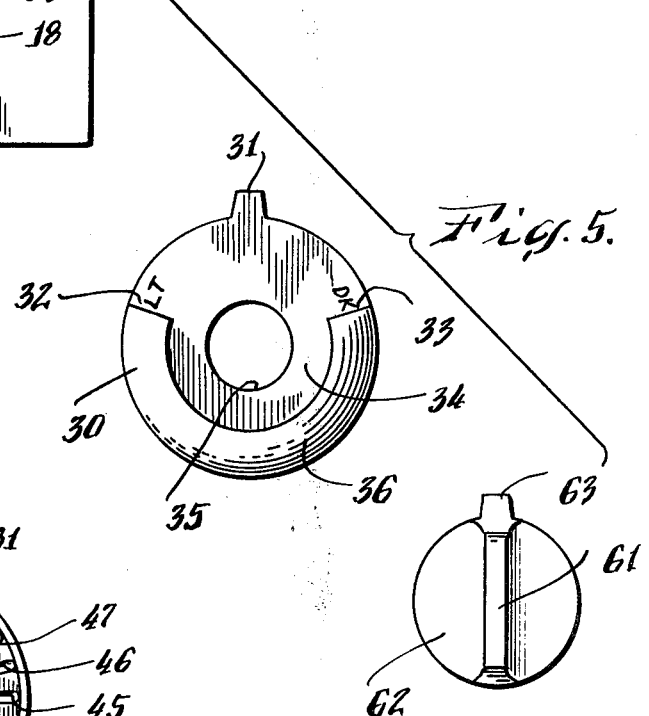
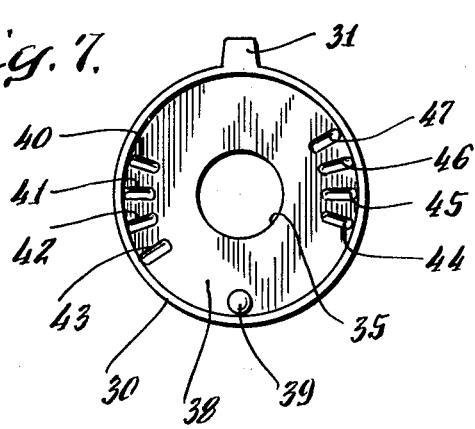
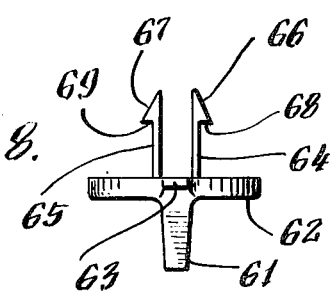

4,140,048

TOAST LOAD SELECTOR MECHANISM

BACKGROUND OF THE INVENTION

This invention relates to a toast load selector mechanism for use with a toasting time interval brownness control, and in particular for providing a limited adjustment range of the brownness control to compensate for various differing toast loads.

With reference to U.S. Pat. No. 3,684,860, there is disclosed an electric toaster of the oven toaster type which can also be used as an oven. The electric toaster includes a heat-up cool-down bimetal timer 82 which accurately controls the duration of the toasting time interval. A cam 192, rotated by a browness control knob 62, adjusts the length of the toasting time interval, and hence the color or degree of brownness of the toast. Clockwise rotation of the brownness control knob 62 and cam 192 increases the toasting time interval to provide browner toast, and counterclockwise rotation of the brownness control knob 62 and cam 192 decreases the toasting time interval to provide lighter toast.

The heat-up cool-down bimetal timer 82 and the associated brownness control, although achieving accurate control of a toasting time interval, are not entirely satisfactory because the degree of color or brownness is also affected by the toast load, e.g., whether one or four slices of toast are placed in the toasting chamber for toasting. Because it is the toasting time interval that is controlled, the heating elements are operated for a time interval providing a given amount of heat to the toasting chamber. If there is one slice of bread to absorb the heat and be toasted thereby, and if the brownness control is set on light, the system works admirably. However, if there are four slices of toast to absorb the heat and the brownness control is set on light, the heat is divided among the four slices and none is toasted sufficiently. Similarly, if four slices of toast are placed in the toasting chamber and the brownness control is set to dark, the system also works well. But, if there is one slice of toast in the toasting chamber and the brownness control is set to its maximum brown position, the one slice of toast is overly toasted to a condition better described as black than brown. Yet, the entire range of adjustment of the brownness control knob 62 and the associated cam 192 are necessary for operating the oven toaster with a variety of loads and brownness selections from one light slice to four dark slices.

Initial attempts to solve this problem consisted of placing indicia on the panel surrounding the brownness control knob 62, the indicia indicating that certain ranges of brownness control knob rotation corresponded to various toast loads. However, this solution was not readily understood and carried out by casual users of the appliance.

SUMMARY OF THE INVENTION

A principal object of the present invention is to provide a toast load selector for use with a toast brownness control of a toasting time interval timer and having provision for selecting the toast load.

Another object of the present invention is to provide a toast load selector mechanism wherein the toast load, i.e., the number of slices, is selectable and concurrently sets the adjustment range of the brownness control appropriate for the load.

An additional object of the present invention is to provide a toast selector mechanism for use with a brownness control wherein the brownness control sets both the toast load and the degree of brownness desired.

A further object of the present invention is to provide a toast load selector mechanism for use with a toast brownness control of a toasting time interval timer wherein the toast load selector is readily operated and understood.

It is yet another object of the present invention to provide a toast load selector mechanism which is comprised of a small number of easily assembled parts and which is durable.

A toast load selector mechanism according to the invention herein for use with a brownness control of a toasting time interval timer includes a toast load selector ring surrounding the brownness control. The toast load selector ring may be set at a plurality of positions each corresponding to a different toast load. The toast load selector ring limits the adjustment range of the brownness control to that portion of its total adjustment range which is applicable to the selected toast load.

In the preferred embodiment, the toast load selector ring is captured between a brownness control knob secured to a brownness control shaft and a panel of the oven toaster in front of which the toast brownness control is mounted. Leaf springs angularly protrude from the panel and terminate in U-shaped detent fingers which are selectively captured in detent engagement in slots formed on the back of the toast load selector ring to secure it at each of the plurality of toast load positions corresponding to a toast load, and the leaf springs yield to permit movement of the toast selector ring between the various toast load positions. A post extends from the selector ring through an arcuate slot in the panel to limit rotation of the selector ring to the desired range of positions. The toast selector ring defines stops limiting the amount of rotation of the brownness control knob to a limited subrange applicable to the selected toast load. Further rotation of the control knob drives the toast load selector ring to the next adjacent toast load position. A pointer associated with the toast selector ring cooperates with indicia on the panel to indicate the selected toast load position, and the toast load selector ring includes indicia indicating the brownness adjustment of the control knob for the selected toast load.

Other features and objects of the invention will in part be obvious to those skilled in the art and will in part appear from a perusal of the followng description of the preferred embodiments and claims taken together with the drawings.

DRAWINGS

FIG. 1 is a front elevation view of a toast load selector mechanism according to the invention herein mounted to the front panel, partially cut away, of an oven toaster, the toast load selector mechanism being shown in a one slice toast load position and a brownness control set toward light toast;

FIG. 2 is a front elevation view similar to FIG. 1, of the toast selector mechanism in a two slice toast load position and the brownness control set for dark toast;

FIG. 3 is a front elevation view, similar to FIG. 1, of the toast selector mechanism in a three slice toast load position and the brownness control set for light toast;

FIG. 4 is a front elevation view, similar to FIG. 1, of the toast load selector mechanism in a four slice toast load position and the brownness control set for dark toast;

FIG. 5 is an exploded front elevation view of the toast selector mechanism of FIG. 1;

FIG. 6 is a side elevation view of a spider spring member of the toast selector mechanism of FIG. 1;

FIG. 7 is a rear elevation view of a toast selector ring of the toast selector mechanism of FIG. 1;

FIG. 8 is a side elevation view of a brownness control knob of the toast load selector mechanism of FIG. 1;

FIG. 9 is a sectional view of the toast load selector mechanism of FIG. 1 taken along the lines 9—9 of FIG. 1; and FIG. 10 is a real elevation view of the toast load selector mechanism of FIG. 1.

The same reference numerals refer to the same elements throughout the various Figures.

DESCRIPTION OF PREFERRED EMBODIMENT

A toast load selector mechanism 10 according to the invention herein is shown mounted to the front panel 15 of an oven toaster in FIG. 1. The oven toaster may be of the type disclosed in U.S. Pat. No. 3,684,860 entitled Electric Toaster With Improved Heat-Up Cool-Down Bimetal Timer and issued Aug. 15, 1972. That patent discloses a heat-up cool-down bimetal timer for accurately controlling the duration of a toasting time interval, and hence the color or degree of brownness of the toast. That timer mechanism is generally referred to by the number 82 in that patent, and includes a brownness control for varying the color or degree of brownness of the toast within an adjustment range. The brownness control comprises a shaft and cam 192 and is operated by a brownness control knob 62 mounted to the shaft and cam 192.

The toast load selector mechanism of the invention herein is adapted for use with a heat-up cool-down bimetal timer of the type disclosed in U.S. Pat. No. 3,684,860. In particular, with reference to FIGS. 9 and 10, a shaft 192 is designated by the same reference number as used for the corresponding shaft in the apparatus disclosed in U.S. Pat. No. 3,684,860, the remaining portions of the heat-up cool-down bimetal timer and other portions of the electric oven toaster with which the toast load selector mechanism of this invention is used may be the same or similar to that disclosure, which is incorporated herein by reference. In keeping with the prior disclosure, the control knob for this adjustment is given the reference numeral 62.

As noted above, the unsatisfactory aspect of the improved heat-up cool-down bimetal timer and the toast brownness control thereof of U.S. Pat. No. 3,684,860 is that the brownness of the toast is also dependent upon the toast load, and no specific provision for compensating for the toast load was provided.

The toast selector mechanism 10 of the present invention generally comprises a toast load selector ring 30 which surrounds the brownness control knob 62. The toast load selector ring 30 is selectively rotatable between a plurality of discreet positions, each position corresponding to a different toast load. In the embodiment shown, the toast load varies between one and four slices, and hence four positions for the toast load selector ring are provided. The toast load selector ring 30 includes a pointer 31 cooperating with indicia "1," "2," "3" and "4" (also indicated by the reference numerals 1 - 4) provided on the front panel 15 of the oven toaster to identify the four positions. The term "slices" is also preferably printed on the front panel 15 above the indicia 1 - 4 so that the user can readily understand the meaning of the indicia. The toast load selector mechanism 10 further comprises means for retaining the toast load selector ring 30 at each of the four toast load positions, and yet permitting selective rotation therebetween, the retaining means being more fully described below.

The brownness control knob 62 is mounted concentrically with the toast load selector ring 30, and includes a pointer 63. Rotation of the brownness control knob 62 alters the timing interval of the toasting time interval timer, clockwise rotation of the brownness control knob 62 increasing the toasting time and counterclockwise rotation of the brownness control knob 62 decreasing the time interval. Absent the toast load selector ring 30, the brownness control knob 62 has 180° of permissible rotation, with the pointer 63 travelling through a 180° arc above a horizontal line intersecting the center of the control knob.

However, the toast load selector ring 30 is provided with stops 32 and 33 which limit the permissible rotation of the brownness control knob 62 for any given selected toast load. In the embodiment shown, the brownness control knob 62 is limited to rotation of 135° between the stops 32 and 33 of the toast load selector ring 30. Further rotation of the brownness control knob 62 with its pointer 63 engaged against one of the stops 32 or 33 of the toast load selector ring 30, drives the toast load selector ring 30 with the brownness control knob 62 to select a different toast load position.

The foregoing is illustrated in FIGS. 1 - 4. FIG. 1 shows the toast load selector ring 30 at its one slice toast load position, as indicated by pointer 31 being positioned adjacent indicia 1. The brownness control knob 62 has a 135 degree adjustment subrange from the light toast position, indicated by the letters "LT" printed on the toast load selector ring 30 adjacent stop 32, and the dark toast position, indicated by the indicia "DK" printed on the toast load selector ring 30 adjacent stop 33. The brownness control knob 62 is blocked by stop 33 from rotation through the remaining clockwise 45° to the maximum dark setting of the toast interval timer. The toasting time interval timer is set for the minimum toasting time when the toast load selector ring is in the one slice toast load position and the control knob 62 is set against stop 32, at the LT indicia, which produces light toast with a one slice toast load. When the toast brownness control knob 62 is rotated such that its pointer 63 is engaged against stop 33, i.e., at DK of the toast load selector ring, the toasting time interval timer provides a toasting interval which is less than the maximum, but is proper for toasting one slice to dark brown without burning it.

Further clockwise rotation of the brownness control knob 62, engaged against stop 33, drives the toast load selector ring 30 to the next position, and referring now to FIG. 2, the toast load selector ring 30 is set at the two slice load position, with the pointer 31 and indicia 2 so indicating. The brownness control knob 62 is still provided with 135° of permissible rotation between the stops 32 and 33, but the range of rotation has been shifted 15° clockwise. Thus, when the brownness control knob 62 is set at the light position against stop 32 of the toast load selector ring, the toasting time interval timer provides a longer toasting period than is provided by setting brownness control knob 62 against stop 32 with the toast load selector ring 30 in the one slice load position shown in FIG. 1. The longer toasting time interval is sufficient to toast two slices to light brown condition, the extra time compensating for the additional toast load. Similarly, the toasting time interval with the control knob set against stop 33, the dark toast position, is increased with the toast load selector ring 30 in the two slice load position, as compared with the toasting time interval on the dark setting in the one slice load position, such that two slices are toasted to dark brown. It will be appreciated that this requires more heat which is supplied by the longer toasting time interval, and the shift in the adjustment subrange of brownness control knob 62 provides for this.

FIGS. 3 and 4 are somewhat similar to FIGS. 1 and 2 respectively showing the toast load selector ring 30 at the three and four slice load positions. When the selector ring is in the four slice load position shown in FIG. 4, the brownness control knob can be rotated to the maximum time interval for the toasting time interval timer, which coincides with the maximum rotation of brownness control knob 62 against stop 33.

In FIGS. 6 – 10, the structure of the toast load selector mechanism is shown in more detail. Referring first to FIGS. 9 and 10, a shaft 192 is shown (as noted above shaft 192 corresponds to shaft 192 of the apparatus disclosed in U.S. Pat. No. 3,684,860) and rotation of shaft 192 adjusts the time interval of a heat-up cool-down bimetal toasting time interval timer or other toasting time interval timer. Shaft 192 is provided with a 180° ring gear 80 having a plurality of peripheral teeth 81, and ring gear 80 cooperates with a second 180° ring gear 70 having mating teeth 71. The ring gears 70 and 80 are preferably in a 1:1 ratio. The second ring gear 70 has a shaft 72 extending through an opening 16 in the front panel 15 to rotatably mount the ring gear 70 engaged with ring gear 80. The shaft 72 defines an axially extending rectangular opening 73 and a flat hub surface 74 surrounds the rectangular opening 73 on the rear side of the ring gear 70, as best seen in FIG. 10.

With reference to FIG. 8, the brownness control knob 62 comprises parallel rearwardly extending legs 64 and 65 terminating respectively in pointed tips 66 and 67, the tips defining flanges 68 and 69. The legs 64 and 65 of the brownness control knob 62 are inserted through the rectangular opening 73 in shaft 72 of ring gear 70, and the flanges 68 and 69 snap over the hub surface 74 to secure the ring gear and brownness control knob 62 together. Engagement of the legs 64 and 65 in the rectangular opening 73 secures the ring gear 70 and brownness control knob 62 together for rotational movement. Brownness control knob 62 further comprises an outwardly protruding flange 61, preferably aligned with pointer 63, for gripping and turning it.

At this point it should be noted that clockwise rotation of the brownness control knob 62 causes counterclockwise rotation of shaft 192 by virtue of the ring gears 70 and 80. In the disclosure of U.S. Pat. No. 3,684,860, counterclockwise rotation of the shaft and cam member 192 decreases the toasting time interval. Inasmuch as it is desirable from an ergonometric standpoint to have clockwise rotation of brownness control knob 62 increase the toasting time interval it is also desirable to appropriately reverse the cam 192 of U.S. Pat. No. 3,684,860 such that counterclockwise rotation thereof, produced by clockwise rotation of the brownness control knob 62, increases rather than decreases the toasting time interval. The gears 70 and 80 of the present disclosure are desirable in particular oven toasters in order to offset the brownness control. However, alternatively the brownness control knob 62 could be connected directly to the shaft and cam 192 of the heat-up cool-down timer 82 shown in U.S. Pat. No. 3,684,860 without reversing the cam and without departing from the invention herein.

The toast load selector ring 30 includes a hub portion 34 defining a central opening 35 through which the legs 64 and 65 of the brownness control knob 62 are loosely accommodated, i.e., the legs 64 and 65 do not engage with the toast load selector ring 30 such that the knob and ring would rotate together. An integral flange 36 of generally triangular cross section (best seen in FIG. 9) partially peripherally surrounds the hub 34 and defines the stops 32 and 33 at its ends. The brownness control knob 62 rests on the hub 34 of the toast load selector ring 30, partially surrounded by the flange 36. An angle of 135° is defined between the stop 32 and 33, and the hub 34 extends to the diameter of the flange between the stops. The "LT" and "DK" indicia are affixed to that portion of the hub adjacent the stops 32 and 33, respectively, and the pointer 63 of the brownness control knob 62 overrides the hub between stops 32 and 33. The toast load selector ring pointer 31 extends from the hub portion 34 midway between the stops 32 and 33.

The toast load selector ring 30 is positioned between the brownness control knob 62 and the front panel 15, and a spider spring member 50 is mounted to the front panel 15 adjacent the rear surface 38 of the toast load selector ring 30.

As best seen in FIG. 7, the rear surface 38 of the toast load selector ring 30 defines a plurality of slots 40 – 47 extending partially therethrough, and the slots 40 – 47 cooperate with the spider spring member 50 to selectively position the toast load selector ring 30 at the four toast load positions. More particularly, the slots are deployed in opposed pairs 40 – 43 and 44 – 47, and slots 40 and 44 are diametrically opposed, as are slots 41 and 45, slots 42 and 46, and slots 43 and 47. The adjacent slots, e.g., slots 40 and 41, are separated by an angle of 15°, wherein the total angle between slots 40 and 43 is 45°. This 45° angle, together with the 135° angle defined between the stops 32 and 33 of the toast load selector ring 30, adds to the 180° total permissible rotation of the brownness control knob 62.

The spider spring member 50 comprises a central ring 51 with two protruding tabs 52 and 53 which are received in slots 17 and 18 in the front panel 15, wherein the spider member is positioned on the front panel 15 and secured against rotation with respect thereto. The spider spring member 50 further comprises two leaf spring members 54 and 55 which are integrally joined with the ring 51 and extend angularly outwardly from the front panel 15. The leaf springs 54 and 55 terminate at their respective free ends in U-shaped detent fingers 56 and 57, which are diametrically opposed. The detent members 56 and 57 are received in detent engagement in the slots 40 – 47 on the rear surface 34 of the toast load selector ring 30. In particular, the detent member 56 is received in slot 47 and the detent member 57 is received in slot 43 when the toast load selector ring 30 is in the one slice load position, and the detent fingers shift one notch for each additional slice load position.

As perhaps best seen in FIG. 9, the spider spring member 50 biases the toast load selector ring 30 and the brownness control knob 62 nested therein away from the front panel 15, and also maintains the flanges 68 and 69 of legs 64 and 65 of the brownness control knob 62 engaged against the hub surface 74 of the ring gear 70. The leaf spring members 54 and 55 yield to permit rotation of the toast load selector ring 30, the detents 56 and 57 riding over the back surface 38 and snapping into the next adjacent slots.

The toast load selector ring 30 further comprises a stop shaft 39 extending from the rear surface thereof, and an arcuate slot 19 is provided in the front panel 15 to receive the shaft 39. The shaft 39 engages against the ends of the arcuate slot 19 when the toast load selector ring is in its maximum positions, i.e., the one and four slice toast load positions, to prevent rotation of the toast load selector ring beyond these positions. The leaf spring members 54 and 55 and their detents 56 and 57 are insufficient for this purpose, inasmuch as they would merely slide along the back surface 38 of the toast load selector ring between the opposed pairs of slots.

The foregoing toast load selector mechanism 10 admirably achieves the objects of the invention herein, operating to provide an adjustable range of rotation of a toast brownness control depending upon a selected toast load position. It will be appreciated that various changes can be made from the preferred embodiment of the toast load selector mechanism described above, which is illustrative of the invention but not intended to limit it. In particular, it will be readily appreciated that the toast load selector mechanism can be adapted to provide for more or less than four toast load positions. Changes may also be made in the particular means for holding the toast load selector ring in the various adjusted positions, for instance, detent means other than the spider spring member could be used. It would also be possible to reverse the concentricities of the toast load selector ring and brownness control knob such that the brownness control knob were the outer knob. Further, the toast load selector and brownness control could be levers, wherein the load selector lever adjustably limits the adjustment range of the brownness control lever as appropriate for the toast load. Such changes and other modifications which may be apparent to those skilled in the art may be made without departing from the spirit and scope of the invention, which is limited only by the following claims.

We claim:

1. A toast load selector mechanism for use with toasters accommodating toast loads of from one to a plurality of bread slices or other food items for toasting and having a toasting time interval timer including a manually operable brownness control for adjusting the toasting time interval, the brownness control movable through an adjustment range between a first position setting a minimum timer interval for toasting a minimum toast load to a lightest brown condition and a second position setting a maximum timer interval for toasting the maximum toast load to a darkest brown condition, the toast load selector mechanism comprising a toast load selector member defining first and second stops positioned for engaging and limiting the adjustment range of the brownness control to a subrange applicable to a given toast load wherein when the brownness control is set against the first stop the timer interval is set for toasting a given toast load to a light brown condition and when the brownness control is set against the second stop the timer interval is set for toasting the same given toast load to a dark brown condition, the toast load selector member selectively movable between a plurality of positions each of which corresponds to a given toast load wherein the limited subrange of adjustment of the brownness control is applicable to the selected given toast load.

2. A toast load selector mechanism as defined in claim 1 wherein when the toast load selector member is at the lowest toast load position and the brownness control is engaged against the first stop, the toasting time interval timer is set to its minimum timer interval, and when the toast load selector member is set at the maximum toast load position and the brownness control is set against the second stop, the toasting time interval timer is set to its maximum timer interval.

3. A toast load selector mechanism as defined in claim 1 wherein when the brownness control is set against one of the stops of the toast load selector member, movement of the brownness control moves the toast load selector member to another toast load position.

4. A toast load selector mechanism as defined in claim 1 wherein the brownness control is a rotatable knob and the toast load selector member is a selector ring mounted concentrically with the brownness control knob.

5. A toast load selector mechanism as defined in claim 4 wherein the toast load selector ring concentrically surrounds the brownness control knob.

6. A toast load selector mechanism as defined in claim 5 wherein the brownness control knob includes a pointer for engaging the first and second stops defined by the toast load selector ring.

7. A toast load selector mechanism as defined in claim 6 wherein the toast load selector ring carries indicia indicating a light brown toast condition adajcent the first stop and a dark brown toast condition adjacent the second stops.

8. A toast load selector mechamism as defined in claim 4 wherein the toast load selector ring is held in each of the plurality of toast load positions by detent engagement means, the detent engagement means being yieldable to permit rotation of the toast load selector ring between the plurality of toast load positions.

9. A toast load selector mechanism as defined in claim 8 wherein the toast load selector ring is mounted adjacent a panel of the toaster and the detent engagement means comprises at least one leaf spring one end of which is fixed with respect to the panel and the free end of which extends angularly outward from the panel, the free end of the leaf spring terminating in a V-shaped detent finger, and the back surface of the toast load selector ring facing the panel defines slots which receive the detent finger in detent engagement to hold the toast load selector ring in the selected toast load positions.

10. A toast load selector mechanism as defined in claim 9 wherein the detent engagement spring means comprises two leaf springs diametrically opposed across the back surface of the toast load selector ring and the toast load selector ring defines a group of slots for each leaf spring.

11. A toast load selector mechanism as defined in claim 9 wherein the toast load selector ring further comprises a pointer and the toaster includes indicia indicating the toast load and positioned for cooperating with the pointer of the toast load selector ring for indicating the toast load position thereof.

12. A toast load selector mechanism as defined in claim 11 wherein the toaster accommodates up to four bread slices or other food items for toasting and the toast load selector ring is selectively positionable at four toast load positions.

13. A toast load selector mechanism as defined in claim 12 wherein the brownness control knob has a range of rotation of 180° and the toast load selector ring limits the brownness control knob to an adjustment subrange of 135° of rotation in any given toast load position, and the toast load selector mechanism rotates 15° between each adjacent toast load position, whereby the total range of adjustment of the brownness control knob is utilized.

14. A toast load selector mechanism as defined in claim 9 wherein the toast load selector ring further defines a stop extending through a slot defined by the toaster panel, engagement of the stop with the ends of the slot limiting rotation of the toast load selector ring to between the toast load positions.

* * * * *